United States Patent [19]

Nedblake et al.

[11] Patent Number: 5,421,933
[45] Date of Patent: Jun. 6, 1995

[54] SYSTEM FOR PRODUCING LABELS FROM A WEB

[75] Inventors: Greydon W. Nedblake, Kansas City; John Garber, Fenton, both of Mo.

[73] Assignee: Graydon Wesley Nedblake, Kansas City, Mo.

[21] Appl. No.: 996,089

[22] Filed: Dec. 23, 1992

[51] Int. Cl.$^6$ .............................................. B32B 31/00
[52] U.S. Cl. .................................. 156/249; 156/256; 156/272.8; 156/264; 156/273.3; 156/275.7; 156/289; 156/299
[58] Field of Search .................... 156/247–249, 156/250, 252, 261, 256, 264, 265, 267, 269, 272.8, 273.3, 275.7, 285, 289, 299; 219/121.6, 121.66, 121.67, 121.71, 121.72, 121.76, 121.77

[56] References Cited

U.S. PATENT DOCUMENTS

| | | |
|---|---|---|
| 3,909,582 | 9/1975 | Bowen . |
| 3,989,778 | 11/1976 | Osborne ............................ 156/272.8 |
| 4,537,809 | 8/1985 | Ang et al. . |
| 4,598,376 | 7/1986 | Burton et al. . |
| 4,699,684 | 10/1987 | Osborne . |
| 4,739,487 | 4/1988 | Bonnet et al. . |
| 4,752,352 | 6/1988 | Feygin ...................................... 156/59 |
| 4,786,046 | 11/1988 | Freeman et al. . |
| 4,793,891 | 12/1988 | Freeman et al. . |
| 4,798,648 | 1/1989 | Freeman . |
| 4,799,590 | 1/1989 | Furman ................................. 206/390 |
| 4,851,061 | 7/1989 | Sorkoram . |
| 4,886,680 | 12/1989 | Tindall . |
| 4,945,203 | 7/1990 | Soodak et al. ................... 156/281 X |
| 4,978,415 | 12/1990 | Jones . |
| 4,987,287 | 1/1991 | Jack . |
| 5,015,312 | 5/1991 | Kinzie ..................................... 156/58 |
| 5,049,720 | 9/1991 | Fang et al. ....................... 219/121.77 |
| 5,091,035 | 2/1992 | Anhäuser ......................... 156/256 X |

OTHER PUBLICATIONS

Photocopy Brochure—Waddingtons Rolls Out a Revolution in Labelling—4 Pages of photocopy.
Package Printing & Converting; Jul. 1992; "Labeling-Release liner waste management—more than a burning ussue" pp. 25 and 27.
The Blazer 6000 Laser Marking System; Lasertechnics of Albuquerque, N. Mex.

*Primary Examiner*—Chester T. Barry
*Attorney, Agent, or Firm*—Hovey, Williams, Timmons & Collins

[57] ABSTRACT

A labelling system dispenses a web of label material having a coating of non-tacky adhesive, subsequently activates the adhesive, cuts the web using a laser beam to produce labels therefrom, and then applies the labels to respective packages. In another embodiment, a carrier sheet is separated from an adhered web whereupon the web is then cut using a laser beam to form labels and a waste matrix. The labels are then rejoined to the carrier sheet.

16 Claims, 2 Drawing Sheets

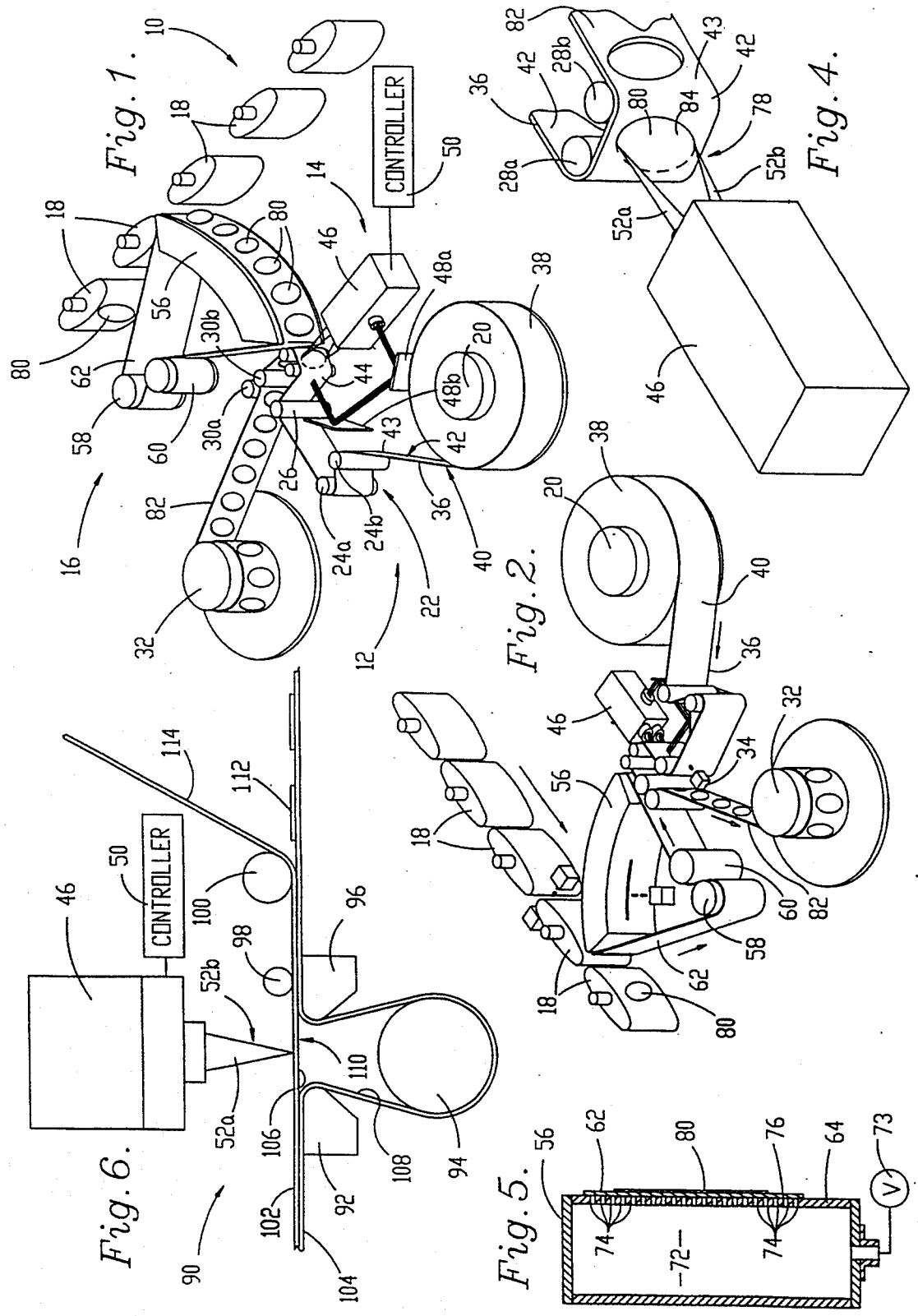

SYSTEM FOR PRODUCING LABELS FROM A WEB

BACKGROUND OF THE INVENTION

1. Field of the Invention

The present invention relates to the field of label manufacture. More particularly, the invention concerns a labelling system that dispenses a web of label material having a coating of non-tacky adhesive, subsequently activates the adhesive, cuts the web using a laser beam to produce labels therefrom, and then applies the labels to respective packages. In another embodiment, a carrier sheet is separated from an adhered web whereupon the web is then cut using a laser beam to form labels and a waste matrix. The labels are then rejoined to the carrier sheet.

2. Description of the Prior Art

In the prior art, pressure sensitive labels are produced by using a die to cut a printed web releasably adhered to a carrier sheet in order to form a label and a waste matrix. The matrix is then removed leaving the labels spaced on the carrier sheet that is then formed into a roll. In order to apply the labels to the package, a label dispenser strips the labels from the carrier sheet and applies them to respective packages. The carrier sheet is then discarded as waste.

As those skilled in the art will appreciate, this prior art system of labeling packages presents a number of problems. For example, the carrier sheet typically represents nearly one-half the material cost of label production. This is a tremendous waste of financial and natural resources, and the spent carrier sheet presents an ongoing trash disposal burden.

Additionally, a die must be custom manufactured for each type of label and additional dies provided as replacements for worn-out dies. Furthermore, these dies must be stored between production runs.

SUMMARY OF THE INVENTION

The label production system of the present invention solves the prior art problems discussed above and provides a distinct advance in the state of the art. More particularly, the invention hereof eliminates the need for a carrier sheet in the production and application of labels to packages, and eliminates the need for custom manufactured dies for cutting labels from a web.

The preferred label production system is used at the site of package production. A web of non-tacky label material having a coating of activatable adhesive thereon is dispensed from a supply, preferably in the form of a roll. One or more laser beams cut through the web along a continuous, predetermined path in order to produce a label from the web. The label is then applied to a package, with the adhesive being activated at any time during the process but preferably after the label is cut from the web.

In preferred forms, the adhesive coating is heat activatable and is preferably activated by a laser beam. Additionally, the preferred system simultaneously uses two laser beams to cut along divergent paths of the web. A preferred vacuum belt arrangement conveys the cut label body from the web matrix to the package.

Another embodiment is concerned with the production of pressure sensitive labels. A carrier sheet and adhered web are dispensed from a supply and then separated. A laser beam cuts the web while separated in order to produce spaced apart labels and a waste matrix. The web is then rejoined to the carrier sheet and the matrix removed in order to produce a carrier sheet with spaced, pressure sensitive labels thereon.

BRIEF DESCRIPTION OF THE DRAWINGS

FIG. 1 is a front view of a schematic representation of the preferred label production apparatus;

FIG. 2 is a rear perspective view of the apparatus of FIG. 1;

FIG. 4 is a partial perspective view of the apparatus of FIG. 1 showing the laser and web cutting;

FIG. 5 is a sectional view taken along line 5—5 of FIG. 3; and

FIG. 6 is a partial elevational view of a schematic representation of a label production apparatus in accordance with a second embodiment of the present invention.

DETAILED DESCRIPTION OF THE PREFERRED EMBODIMENT

Figure 3:
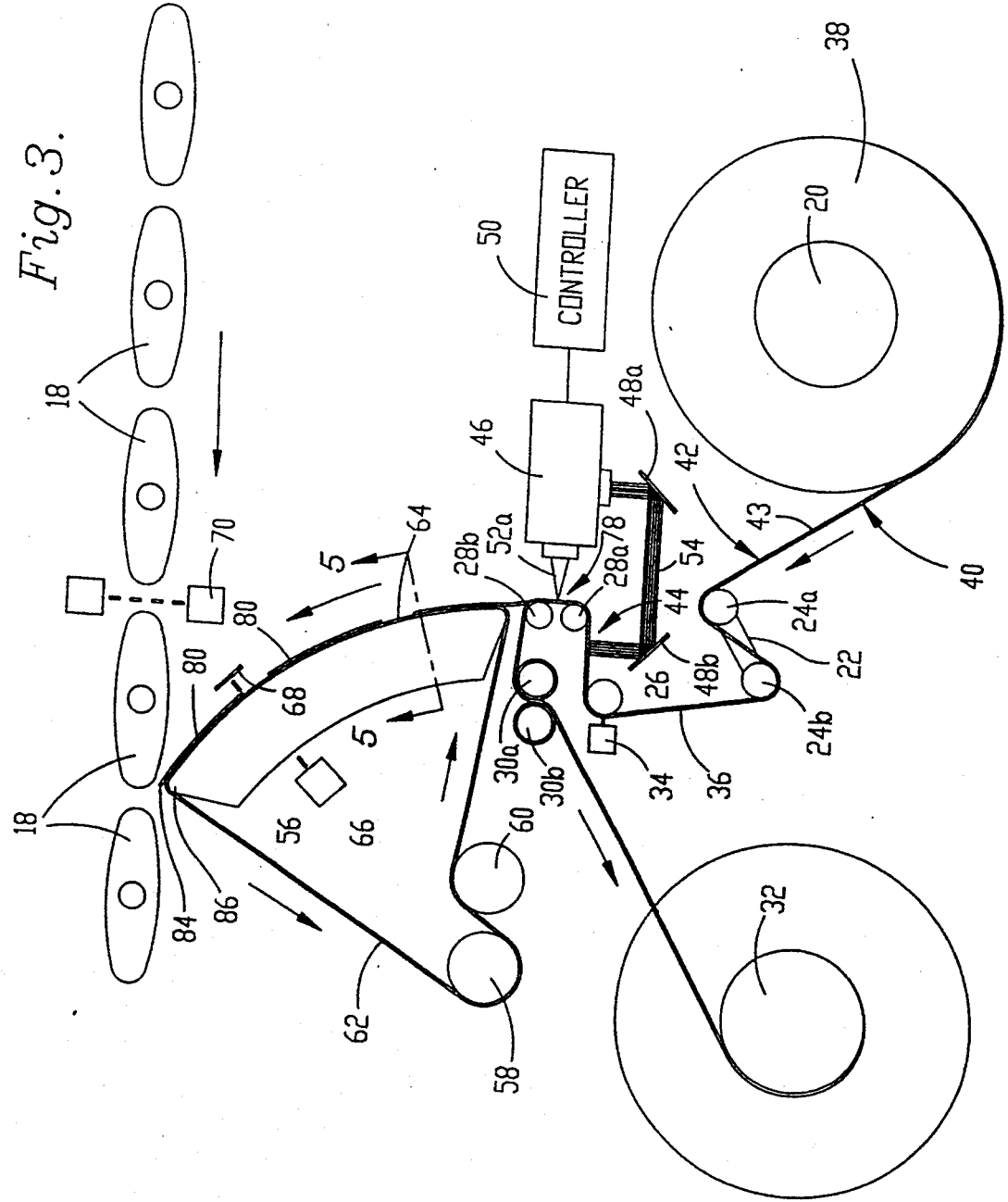
FIG. 3 is a plan view of the apparatus of FIG. 1 showing additional detail.

Referring to the drawing figures, and in particular to FIGS. 1-3, preferred label production apparatus 10 broadly includes web dispensing mechanism 12, laser unit 14, and label application assembly 16 for applying labels to packages 18. In more detail, web dispensing mechanism 12 includes dispensing reel 20, in-feed tension dancer 22 having rollers 24a and 24b, web feed input roller 26, web spacing rollers 28, out-feed drive rollers 30a and 30b, web take-up reel 32, and photoelectric web registration sensor 34 with web 36 routed through mechanism 12 as illustrated. Reel 20 dispenses web 36 from a supply in the form of a roll 38.

Web 36 presents front face 40 with spaced label indicia including registration marks printed thereon, and presents rear face 42 having a coating 43 of non-tacky, heat activatable adhesive. It should also be understood that a wide range of activatable adhesive materials can be used known to those skilled in the art such as solvent activated adhesives or energy-activatable materials for activation by infrared, ultraviolet, or laser beam, for example, or the adhesive could be applied at the site of application. In this way, web 36 is non-tacky as dispensed from supply roll 38 until the adhesive is activated in activation zone 44 as discussed further hereinbelow.

Laser unit 14 includes laser 46, mirrors 48a and 48b and controller 50. Laser 46 is operable to produce upper and lower, continuous, narrow laser beams 52a and 52b, and to produce pulsed, broad laser beam 54 that is routed by mirrors 48a,b to impinge upon web rear face 42 at zone 44 in order to activate adhesive coating 43. Laser 46 is a conventional industrial unit well known to those skilled in the art. The preferred laser unit includes two, 80 watt, carbon dioxide lasers for producing respective beams 52a,b available from Laser Machining, Inc., of Somerset, Wisconsin.

Upper and lower laser beams 52a,b are shiftable in the Y axis in the orientation of FIG. 4 in order to cut through web 36 as it moves past laser 46, although additional shifting in the X axis can occur if needed in certain applications. These movements are controlled by a beam positioner operated by controller 50, both available from General Scanning, Inc., of Water-town, Mass. Controller 50 is programmed to control the movements of beams 52a,b in coordination with the movement of web 36 and the operation of application assembly 16. More particularly, controller 50 is connected with the electrical components of dispensing mechanism 12, laser unit 14, and application assembly 16 for control thereof, and includes label data stored in memory used to control the movement of laser beams 52a,b as required for a specific label.

Label application assembly 16 includes arcuate vacuum shoe 56, belt drive roller 58, tensioning idler roller 60, porous endless belt 62 extending around forward surface 64 of shoe 56 and around rollers 58,60 as illustrated, photoelectric label sensor 66, photoelectric reflection mirror 68, and photoelectric package sensor 70. Vacuum shoe 56 is preferably composed of stainless steel with forward surface 64 polished to present minimal resistance to the movement of belt 62 thereover. The walls of shoe 56 define an interior vacuum chamber 72 coupled with a conventional vacuum source 74. Additionally, a plurality of vacuum openings 74 interconnect chamber 72and forward surface 64 in order to draw a vacuum through porous belt 62 for holding a label against the outboard surface 76 thereof.

To operate apparatus 10, the appropriate label cutting data is loaded into the memory of controller 50. Roll 38 is placed on reel 20 and the leading edge of web 36 threaded through components 22-30 and onto take-up reel 32. In operation, movement of web 36 is continuous. In response to the detection of a registration mark detected by registration sensor 34, controller 50 activates laser 46 to pulse beam 54 in order to activate adhesive coating 43 on the label portion of web face 42 opposite the corresponding label indicia printed on web face 40.

As the label portion moves through cutting zone 78 defined between rollers 28a,b, laser beams 52a,b cut through web 36 along a predetermined path defined by the label data stored in controller 50. As illustrated in FIG. 4, laser beams 52a,b move up and down to cut through web 36 as it moves past the beams in order to produce a label 80 and a web matrix 82.

As the label portion of web 36 exits cutting zone 78, matrix 82 moves around roller 28b. The leading edge 84 of label 80, however, is no longer constrained by web 36 and bridges the gap between dispensing mechanism 12 and application assembly 16 so that belt 62 engages leading edge 84. The vacuum being drawn on shoe 56 causes label 80 to be held against outboard surface 76 of belt 62. This engagement begins before laser beams 52a,b completes the cutting of label 80. In this way, leading edge 84, and thereby label 80 as a whole, is supported on belt 62 before the cutting of label 80 is complete. As those skilled in the art will appreciate, the speed of belt 62 is matched to the movement of web 36.

The movement of belt 62 carries labels 80 with the front indicia face 40 against belt outboard surface 76 with activated adhesive coating 43 exposed outwardly. Sensor 66 detects when the trailing edge of label 80 interrupts the leading beam of sensor 66 as reflected by mirror 68. Sensor 66 and mirror 68 have combined adjustment to accommodate changes in label size. As label leading edge 84 approaches the trailing end 86 of shoe 56, it moves beyond the area of vacuum openings 74. This releases the hold on label 84 and allows it to extend beyond the shoe 56 toward an approaching package 18.

Package sensor 70 detects the leading edge of a package 18 so that the movement of label 80 is coordinated with the presentation of package 18, and so that the face of package 18 engages the adhesive activated face of label 80 at the same speed at which the label 80 is dispensed from application assembly 16. When leading label edge 84 engages the face of package 18, it adheres thereto as does subsequent portions of label 80 until the label is fully engaged and adhered to package 18.

FIG. 6 illustrates apparatus 90, which is a second embodiment of the present invention. Apparatus 90 includes a conventional label manufacturing machine and further includes laser unit 46 operable to produce laser beams 52a,b, controller 50, carrier sheet detachment shoe 92, roller 94, attachment shoe 96, pinch roller 98, and matrix roller 100. Web 102 and carrier sheet 104 are threaded through apparatus 90 as illustrated. Web 102 includes a coating of conventional pressure adhesive on lower surface 106, and carrier sheet 104 includes a conventional release coat on upper surface 108.

In a conventional label manufacturing machine, a continuous roller die is used to cut through web 104 while leaving the carrier sheet intact. As those skilled in the art will appreciate, dies are expensive to manufacture and a custom die must be produced for each type of label. Apparatus 90 eliminates the need for a cutting die by using laser unit 46 to cut web 102 according to label data stored in the memory of controller 50.

In operation, carrier sheet 104 is stripped from web 102 at detachment shoe 102, extends around roller 104, and is rejoined with web 102 between attachment shoe 96 and pinch roller 98. Laser beams 52a,b cut through web 102 in the manner described above in connection with apparatus 10 as web 102 moves through cutting zone 110 extending between shoes 92 and 96. With this configuration, the need for a precisely controlled depth of cut is eliminated because of the separation of web 102 and carrier sheet 104 in cutting zone 110. In this way, more powerful laser beams can be used for higher production speeds.

The cutting of web 102 by beams 52a,b produces labels 112 and matrix 114. The leading edge of a label 112 engages carrier sheet 104 before the trailing edge is cut from web 102. Compression between pinch roller 98 and shoe 96 ensures secure reattachment. Matrix 114 is then stripped from sheet 104 at matrix roller 100 leaving sheet 104 with a plurality of space labels 112 releasable adhered thereto as illustrated.

Having thus described the preferred embodiments of the present invention, the following is claimed as new and desired to be secured by Letters Patent:

1. A method of labeling objects comprising the steps of:

providing a supply of label material configured as an elongated, nontacky web without a carrier sheet presenting a plurality of label bodies surrounded by respective label boundaries;

continuously dispensing said web from said supply;

cutting through said web along said boundaries using a plurality of laser beams for separating said label bodies from said web in continuous succession, said cutting step including the step of controlling said laser beams so that said laser beams cut through said web along divergent paths of each of said label boundaries;

using support means other than said web for supporting said label bodies before and after separation from said web;

transporting said label bodies away from said web in continuous succession toward objects to be labeled; and applying said labels in continuous succession to a respective plurality of the objects thereby labeling the objects.

2. The method as set forth in claim 1, said label bodies presenting respective front and rear faces, said method further including the steps of providing said web with a nontacky adhesive activatable to become tacky on the rear faces of said label bodies, and activating said adhesive to become tacky after said dispensing step.

3. The method as set forth in claim 2, said activating the step including the step of activating said adhesive before said cutting step.

4. The method as set forth in claim 1, further including the step of providing said adhesive as a heat activatable adhesive and, after said dispensing step, using heat to activate said adhesive.

5. The method as set forth in claim 4, further including the step of using a laser beam to create heat for activating said adhesive.

6. The method as set forth in claim 1, said web presenting a longitudinal axis, said cutting step including the steps of passing said web in the direction of said axis in the path of said laser beams and shifting said laser beams in directions transverse to said web axis as said web passes in the path of said beams for cutting through said web along said boundaries.

7. The method as set forth in claim 1, said providing step including the step of providing said web in the form of a roll.

8. The method as set forth in claim 1, said cutting step including the step of using a computer for controlling said laser beams in accordance with data representative of said boundaries stored in memory associated with said computer.

9. The method as set forth in claim 1, said cutting step including the step of using one laser for creating said laser beams.

10. The method as set forth in claim 1, said cutting step including the step of using a respective plurality of lasers for creating said laser beams.

11. The method as set forth in claim 1, said cutting step including the step of using two laser beams as said plurality of laser beams.

12. The method as set forth in claim 1, said cutting step including the step of using at least one carbon dioxide laser for creating said laser beams.

13. The method as set forth in claim 1, said label bodies presenting separated portions adjacent said boundaries after cutting therethrough, said supporting step including the step of supporting said separated portions before separation of said label bodies from said web.

14. The method as set forth in claim 1, further including the step of using a vacuum belt for said supporting, transporting and applying steps.

15. The method as set forth in claim 14, said label bodies presenting separated portions adjacent said boundaries after cutting therethrough, said supporting step including the step of engaging said separated portions by said vacuum belt before separation of said label bodies from said web.

16. The method as set forth in claim 1, further including the steps of using dispensing means for said dispensing step, using laser means having at least one laser for producing said laser beams for said cutting step, and using application means for said supporting, transporting and applying steps, said method further including the steps of positioning said dispensing, laser and application means adjacent to one another, conveying the objects to be labeled in continuous succession past said application means for applying said label bodies to the objects.

* * * * *